United States Patent [19]
Yamamoto et al.

[11] Patent Number: 5,990,873
[45] Date of Patent: *Nov. 23, 1999

[54] SINGLE-KEY INPUT SYSTEM

[75] Inventors: Susumu Yamamoto; Tadahiko Ikegaya; Masahiko Katsurabayashi; Nobuyuki Shigeeda, all of Saitama, Japan

[73] Assignee: Fuji Xerox Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/614,259

[22] Filed: Mar. 12, 1996

Related U.S. Application Data

[63] Continuation of application No. 07/895,448, Jun. 8, 1992, abandoned, which is a continuation of application No. 07/587,048, Sep. 24, 1990, abandoned.

[30] Foreign Application Priority Data

Oct. 3, 1989  [JP]  Japan ................................. 1-261767

[51] Int. Cl.$^6$ ...................................... G09G 5/00
[52] U.S. Cl. ........................................... 345/173; 345/104
[58] Field of Search ...................... 340/706, 707, 340/709, 712; 178/18, 19; 358/468; 382/13, 59, 48; 379/355, 357, 100; 345/156, 157, 173, 179, 182, 180, 104, 146, 113, 134

[56] References Cited

U.S. PATENT DOCUMENTS

| | | | |
|---|---|---|---|
| 4,656,317 | 4/1987 | Tsugei et al. | 178/18 |
| 4,703,412 | 10/1987 | Cunningham. | |
| 4,720,703 | 1/1988 | Schnarel, Jr. et al. | 345/145 |

(List continued on next page.)

FOREIGN PATENT DOCUMENTS

| | | |
|---|---|---|
| 0 066 965 | 12/1982 | European Pat. Off. . |
| 0 093 509 | 11/1983 | European Pat. Off. . |
| 0272070A2 | 6/1988 | European Pat. Off. . |
| 0 277 609 | 8/1988 | European Pat. Off. . |
| 2 319 460 | 10/1973 | Germany . |
| 3117207A1 | 2/1982 | Germany . |
| 3126886A1 | 1/1983 | Germany . |

(List continued on next page.)

OTHER PUBLICATIONS

PCT Publication WO 90/08372, Jul. 26, 1990.
Lobel et al., "Lexikon der Datenverarbeitung." mi verlag modern industrie, 1969, p. 240.
"Digitalisiertablett DIGIT–01," Digital Equipment Hildrand,, "Tough–Sensitive Screen Proximate and Electronically Composable Display," IBM Technical Disclosure Bulletin, Jun. 1984, vol. 27, No. 1A.
Hildebrand, D.B., IBM Technical Disclosure Bulletin, Touch–Sensitive Screen Proximate and Electronically Composable Display, vol. 27, No. 1A, Jun. 1984, pp. 43–44, New York.
Japanese Patent Abstract, JP–59066737, vol. 8, No. 171, Aug. 8, 1984.
IBM Technical Disclosure Bulletin, vol. 20, No. 4, pp. 1466–1468, Sep. 1977, New York.
Texas Instruments Programmable Computer TI–66 Handbook, pp. 1–65, 1983.
L. Alen, "Multi–pad—A New Concept for Data Input" der elekroniker, No. 2, pp. 56–60, (1986).

*Primary Examiner*—Chanh Nguyen
*Attorney, Agent, or Firm*—Finnegan, Henderson, Farabow, Garrett & Dunner, L.L.P.

[57] ABSTRACT

A single key input system for an apparatus such as a facsimile machine having a plurality of operations. A set sequence of functions each of which would normally require the entering of a separate key may be executed by a single key. A coordinate input unit has operator designatable areas. The set sequence of operations is programmed into the apparatus and executed by indicating a designated area. Therefore, the operator can both create a set sequence of functions which are executable through a single key and can designate the location of that key.

20 Claims, 9 Drawing Sheets

U.S. PATENT DOCUMENTS

| | | |
|---|---|---|
| 4,750,151 | 6/1988 | Baus . |
| 4,764,951 | 8/1988 | Kotani et al. ............................. 379/100 |
| 4,786,896 | 11/1988 | Harte ...................................... 340/712 |
| 4,937,762 | 6/1990 | Todome ................................. 340/706 |
| 4,939,507 | 7/1990 | Beard et al. ............................. 345/345 |
| 4,953,226 | 8/1990 | Matsuyama ............................... 382/13 |
| 5,119,079 | 6/1992 | Hube et al. .............................. 345/146 |

FOREIGN PATENT DOCUMENTS

| | | |
|---|---|---|
| 3620938A1 | 1/1988 | Germany . |
| 3809683A1 | 3/1989 | Germany . |
| 3409532C2 | 6/1989 | Germany . |
| 3726208C2 | 7/1989 | Germany . |
| 62-171243 | 10/1987 | Japan . |
| 63-48239 | 4/1988 | Japan . |
| 63-151151 | 10/1988 | Japan . |
| 64-52351 | 3/1989 | Japan . |
| 2 087 611 | 5/1982 | United Kingdom . |
| 2 153 122 | 8/1985 | United Kingdom . |
| 2 154 349 | 9/1985 | United Kingdom . |
| 2 219 675 | 12/1989 | United Kingdom . |

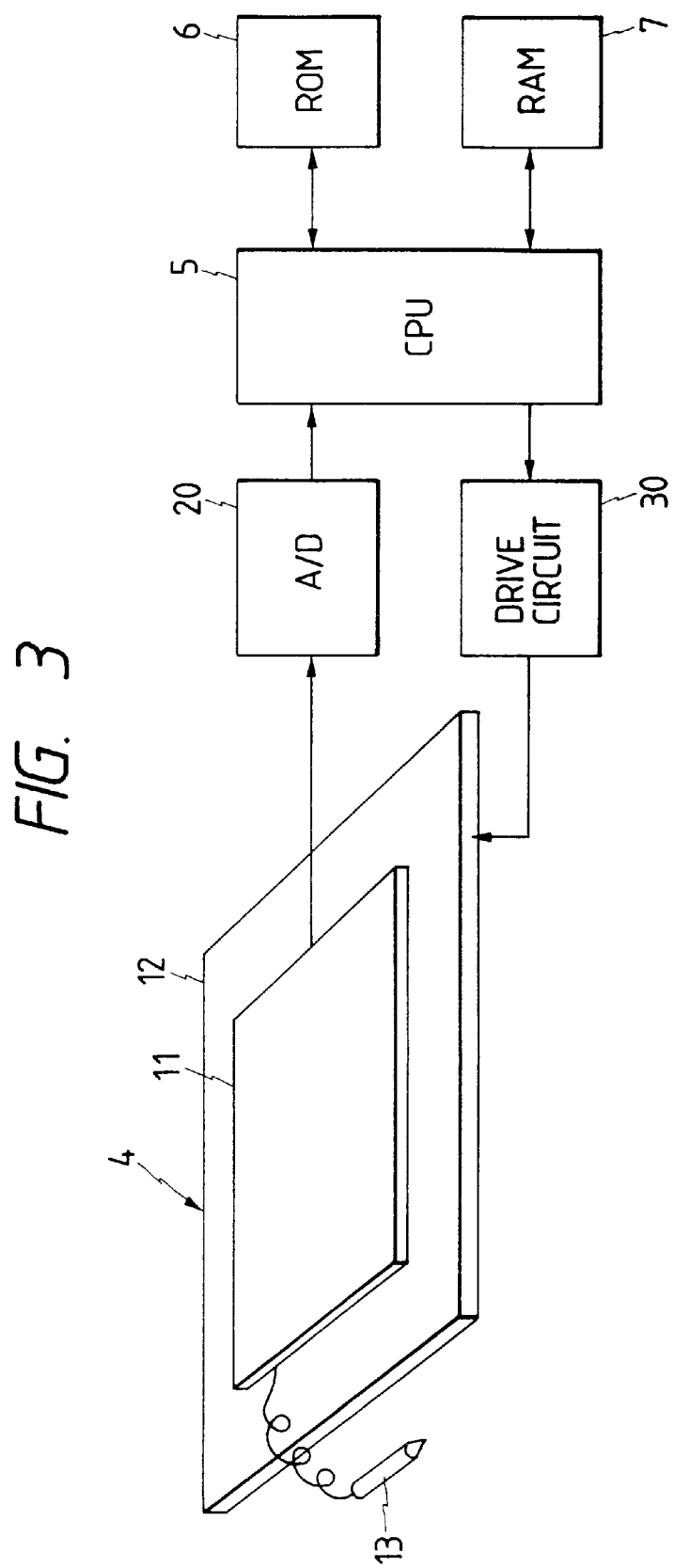

POINT B

POINT A

SINGLE-KEY INPUT SYSTEM

This application is a continuation, of application Ser. No. 07/895,448 filed Jun. 8, 1992, now abandoned, which is a continuation application of Ser. No. 07/587,048, filed Sept. 24. 1990, now abandoned.

BACKGROUND OF THE INVENTION

1. Field of the Invention

The present invention relates to a single-key input system. More particularly the invention relates to a single-key input system in which a sequence of procedural key operations is stored in connection with an area on a coordinate input unit, and later the sequences of key operations are selectively executed in response to touching the various areas.

2. Description of the Prior Art

A facsimile has many functions, such as broadcast transmission, repeat broadcast transmission, polling, time preset transmission, private transmission, copy, and the like. To designate one function, a user may be required to operate a plurality of keys on the operation panel in a predetermined sequence.

To designate a broadcast transmission, for example, the user may be required to operate a key "*," group number "0, 0, 0, 3," a set key, and a start key in that order. To designate a private transmission, the user must operate keys "F, 1, 1" to select the private function, box number "1, 0, 0," a set key, a password "1, 2, 3, 4," a set key, and a start key in that order. To make a copy, keys to select optical density, reduction/ enlargement, the number of copies, and a start key are sequentially operated.

Therefore, a conventional facsimile requires seven key operations for a broadcast transmission. Thirteen key operations are required for a private transmission, and four to five key operations are required for copying. The extensive key operations are troublesome for the user.

During the daily operations of offices and factories, functions such as broadcast transmission, private transmission, and copying are frequently used. Extensive key operations are troublesome and time consuming. Frequently, the keys are erroneously operated. When erroneously operated, the sequence of key operations must be repeated.

Japanese Utility Model Publication No. 1-52351 discloses a program key that has assigned to it various functions such as repeat broadcast transmission, and a sequence of operations for facsimile communication. When the function is required later, it can be initiated by merely operating that key. The sequence of procedural operations are shown on a display. The user may alter the sequence of procedural operations.

The program key is an input which replaces a plurality of sequential operations with a one time operation. Accordingly, there is a limit to the number of program keys that may be used.

Machines users prefer products that may be altered by the operator to reflect the operator's needs. However, in prior art devices, the layouts of the input units are inflexible, and cannot be altered by the user.

Automatic dialing telephone sets, which enable a person to automatically dial a telephone number by pressing a single button, are known. The automatic dialer reduces errors because when a telephone number consisting of many digits is dialed digit by digit, the caller tends to press incorrect buttons. The number of program keys on the automatic dialer equal the number of prestored telephone numbers. The called party of each prestored telephone number must be indicated on a panel. This increases the panel area. To decrease panel area, telephone numbers are displayed on a liquid crystal display laid over a 2-dimensional semiconductor position detector. To dial, a person selects the desired telephone number with a write pen. The telephone set then automatically dials the selected number. (Japanese Patent Unexamined Publication No.63-151151).

Japanese Utility Model Unexamined Publication No. 62171243 discloses a unique telephone directory. A telephone number card is provided on which a table of telephone numbers is superimposed on a coordinate position detector. From among the telephone numbers on the table, a desired telephone number is selected with a light pen. The number is then automatically dialed.

Japanese Utility Model Unexamined Publication No. 63-48239 discloses a tablet input unit. The input unit consists of a tablet input section and a display section, which are superimposed one upon the other. Character data is entered from the tablet input section.

None of the devices mentioned above refer to a technique to exercise a function, such as a repeat broadcast transmission, where a single key operation is used instead of a sequence of key operations.

SUMMARY OF THE INVENTION

Accordingly, an object of the present invention is to solve the problems of the prior art by providing a single-key input system that enables a person to set a desired number of input areas each assigned to a sequence of procedural key operations.

Another object of the present invention is to provide user definable function keys in which the position of the user definable key is adjustable.

Another object of the present invention is to provide a single-key input system in which the sequence of procedural key operations can be stored by a simple operation.

Additional objects and advantages of the invention will be set forth in part in the description that follows and in part will be obvious from the description, or may be learned by practice of the invention. The objects and advantages of the invention may be realized and attained by means of the instrumentalities and combinations particularly pointed out in the appended claims.

The above and other objects of the present invention are attained by a single key input system for an apparatus having a plurality of operations, comprising a coordinate input unit having designatable areas and memory means for storing a plurality of sequences of operations, each of the sequences being associated with a different one of the designatable areas that the selection of one of the designatable areas initiates the execution of the associated sequence of operations.

DESCRIPTION OF THE DRAWINGS

The accompanying drawings, which are incorporated in and constitute a part of this specification illustrate embodiments of the invention and, together with the description, serve to explain the principles of the invention.

In the drawings:

FIG. 3 is a perspective view of a coordinate input unit and related circuitry;

DETAILED DESCRIPTION OF THE PREFERRED EMBODIMENT

The present invention provides a single-key input system in which an area is defined on a coordinate input unit, and a sequence of procedural key operations to exercise a predetermined function is associated with the defined area. Upon designation of the area, the sequence of procedural key operations is automatically executed to exercise the predetermined function.

The coordinate input unit has designatable areas, and a memory means stores a sequence of operations associated with the designatable areas.

In operation, a user first designates an area on the coordinate input unit. The user then operates or presses keys to exercise the desired function in a predetermined sequence. Consequently, the relationship between the designated area and the sequence of procedural key operations is stored in a memory.

To exercise the function, the user simply designates the area on the coordinate input unit by a suitable means. Then, the sequence of procedural key operations which relate to the designated area are automatically executed, and the function is performed. The present invention will be described in detail with reference to the accompanying drawings.

Figure 2:
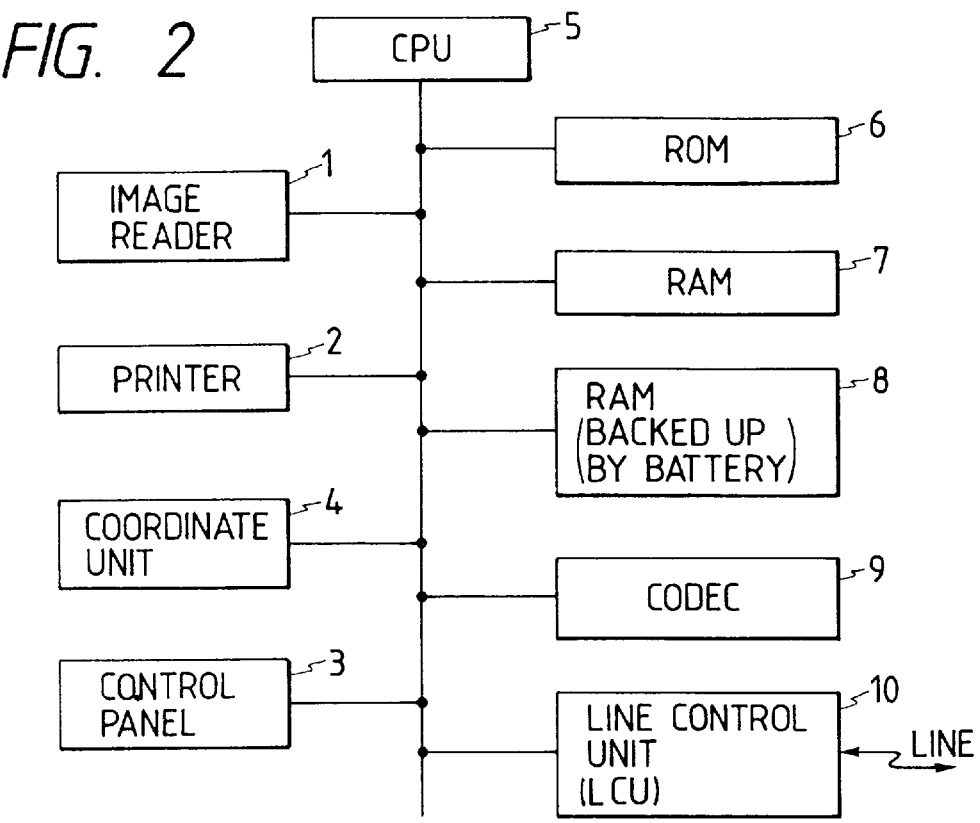
FIG. 2 is a block diagram showing a hardware arrangement according to the first embodiment of the present invention.

FIG. 2 is a block diagram showing a hardware arrangement according to an embodiment of the present invention. The preferred embodiment is a facsimile machine. The facsimile machine includes an image reader 1; a printer 2; a control panel 3; a coordinate unit 4; a CPU 5; a ROM 6; a first RAM 7; a second RAM 8 backed up by a battery; a coding and encoding unit (CODEC) 9; and a line control unit (LCU) 10.

FIG. 3 is a perspective view of the coordinate unit 4 and related circuitry. The coordinate unit 4 is made up of a transparent coordinate input unit 11, a liquid crystal display (LCD) board 12 placed under the coordinate input unit 11, and a stylus pen 13. The coordinate input unit 11 and the LCD board 12 can be used in a desired relative positional relationship. The coordinate input unit 11 is connected through an analog to digital (A/D) converter 20 to the CPU 5. The LCD board 12 is connected through a driver 30 to the CPU 5.

Figure 4:
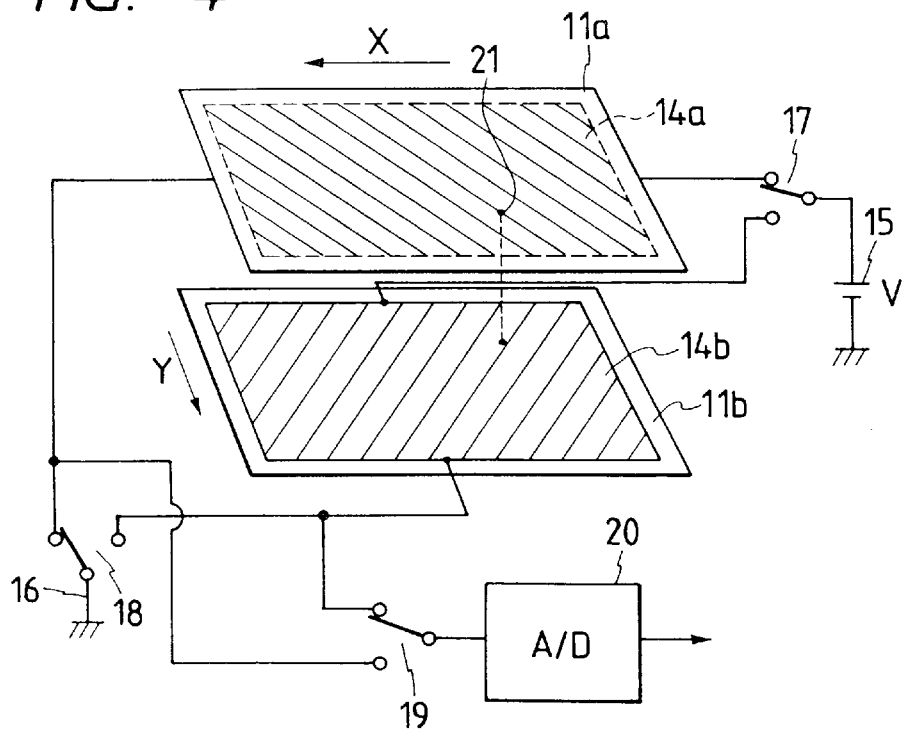
FIG. 4 shows an exploded perspective view of the coordinate input unit and related circuitry.

A specific example of the coordinate input unit 11 will be described with reference to FIG. 4, which shows an exploded perspective view of the coordinate input unit 11 and its related circuitry. The coordinate input unit 11 includes an upper insulating sheet 11a the lower side of which is uniformly coated with a resistive member 14a, and a lower insulating sheet 11b the lower side of which is uniformly coated with a resistive member 14b. A spacer (not shown) is inserted between the upper and lower insulating sheets 11a and 11b, to separate them from each other. A power source 15 and a ground terminal are coupled to the upper insulating resistive member 14a. The power source 15 creates a current through the upper insulating resistive member 14a in the direction X. The power source 15 and the ground terminal are also coupled to the lower insulating resistive member 14b, to cause current therethrough in the direction Y.

A first switch 17 selectively connects the upper and lower insulating sheets 11a and 11b to ground. A second switch 18 switches a connection 16 of a second ground terminal. A third switch 19 selectively connects the upper and lower insulating resistive members 14a and 14b to an A/D converter 20.

A dot 21 is entered on the coordinate input unit 11 by the stylus pen 13. When the upper insulating sheet 11a is pushed by the stylus pen 13, the upper resistive member 14a and the lower resistive member 14b come into contact at the point so that conduction occurs.

Figure 5:
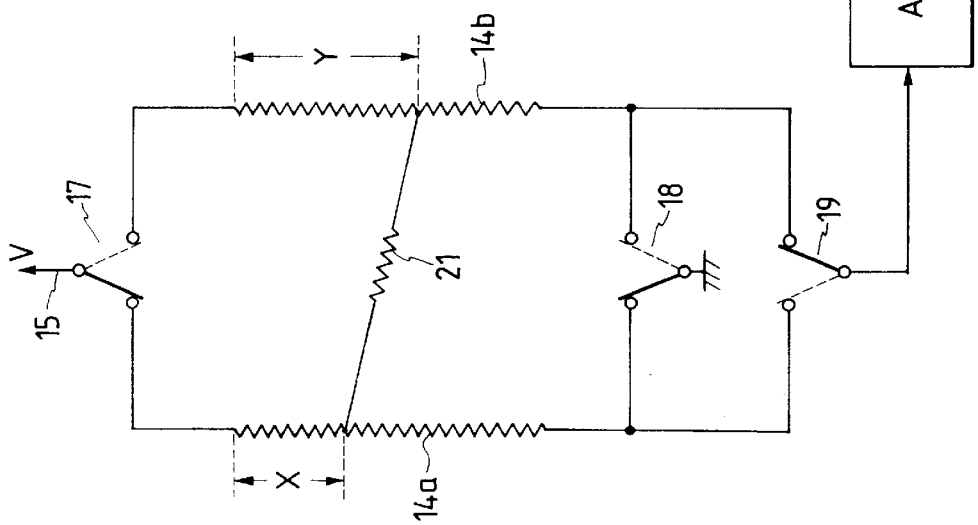
FIG. 5 shows an equivalent circuit of the coordinate input unit.

FIG. 5 shows an equivalent circuit of the coordinate input unit 11. In FIG. 5, like or equivalent portions are designated by like reference symbols in FIG. 4.

When the first to third switches 17 to 19 are positioned as indicated by solid lines, current flows through the upper resistive member 14a to ground. A divided voltage representing an X-coordinate formed by the upper resistive member 14a is detected by the A/D converter 20, through resistors 21 and 14b. Since the input resistance of the A/D converter 20 is very large, little current flows through the resistors 21 and 14b. After a predetermined period of time, the first to third switches 17 to 19 are switched to the positions indicated by dotted lines. Then, a divided voltage representing a Y-coordinate formed by the lower resistive member 14b is detected by the A/D converter 20.

Figure 1:
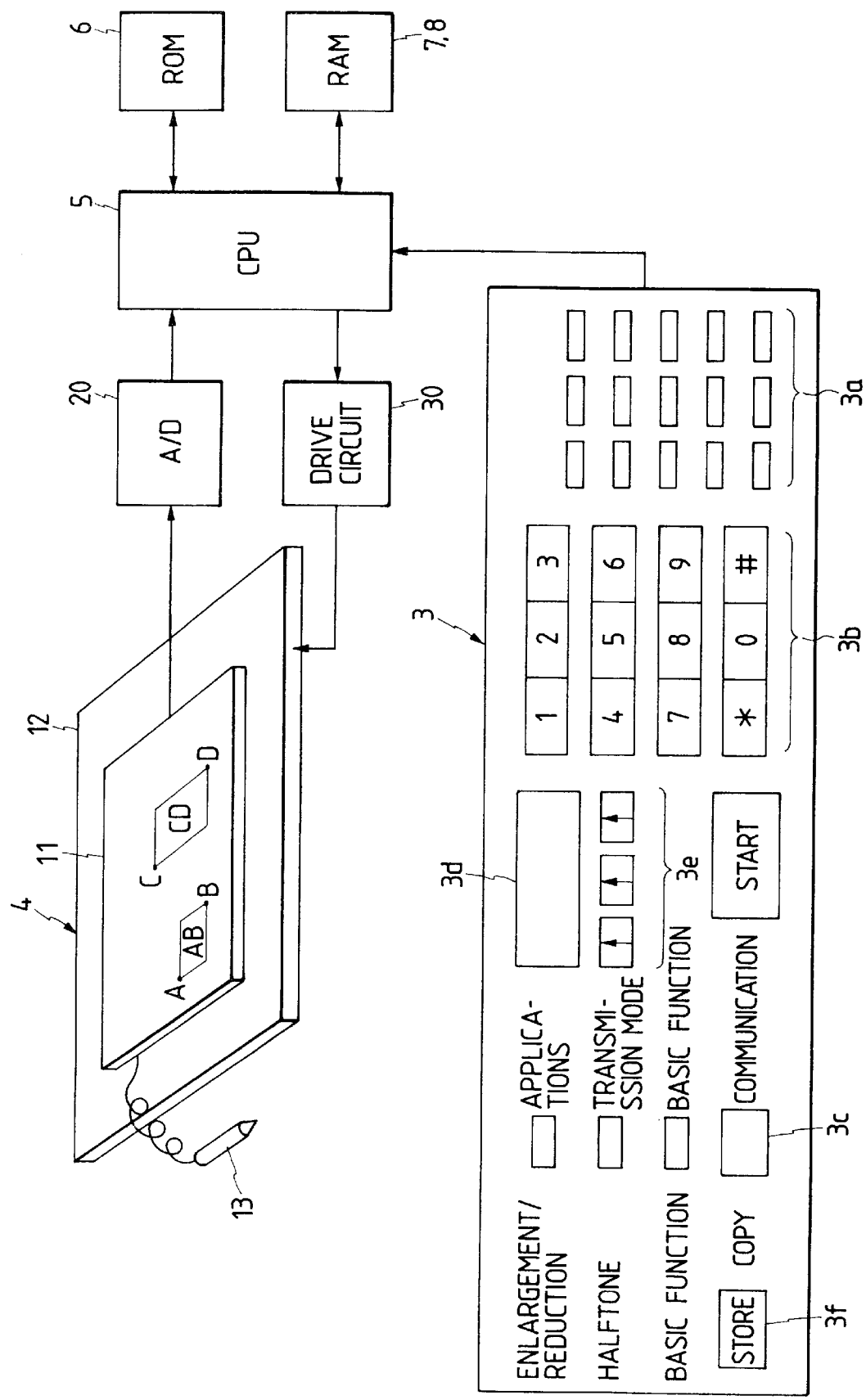
FIG. 1 shows, in block and schematic form, an arrangement of a key portion of a first embodiment of the present invention.

The operation of the preferred embodiment will be described with reference to FIG. 1. The control panel 3 includes one-touch keys 3a; a ten key keyboard 3b; a function key 3c; a display window 3d; cascade keys 3e; and a store key 3f. When the function key 3c is pushed to the left, a copy mode is selected. When the function key 3c is pushed to the right, a communication mode is selected.

In operation, the store key 3f is first pushed on the control panel 3 to begin execution of a program stored in the ROM 6 and to cause the CPU 5 to enter a store mode.

When points A and B on the coordinate input unit 11 are pressed with the stylus pen 13, the coordinates of the two points are recognized by the CPU 5. An area AB defined by the points A and B is treated as an area operably equivalent to a key, under control of the store program. The area AB is stored in either the RAM 7 or the RAM 8. Frame data defined by the points A and B is transferred through the drive circuit 30 to the LCD display board 12 and is displayed on the LCD display board 12. Then, in this instance, a user pushes keys "*", "0, 0, 0, 3", set key, and a start key in successive order. The indicated keys are input to the CPU 5, in the form of code numbers. The code numbers are stored in the RAM 7 or the RAM 8, along with the relationship to the area AB. In this way, a sequence of procedural steps for broadcast communication are stored in association with the area AB.

To define another area CD on the coordinate input unit 11 as another function key, the user first pushes points C and D on the coordinate input unit 11 with the stylus pen 13. The user then pushes the keys of optical density, reduction/enlargement, number of copies, and the start key in successive order. A sequence of procedural steps for a copy operation is now stored in the area CD.

In this way, the user can designate a desired area on the coordinate input unit 11, and store a sequence of procedural steps for a desired key.

The correspondence between the coordinate input unit 11 areas and the stored functions may be written down on thick paper; e.g., Area AB=Broadcast communication, Area CD=Copy, and the like, and the paper placed by the facsimile. Alternatively, the stored functions may be displayed on the corresponding areas of the LCD board 12.

Figure 7:
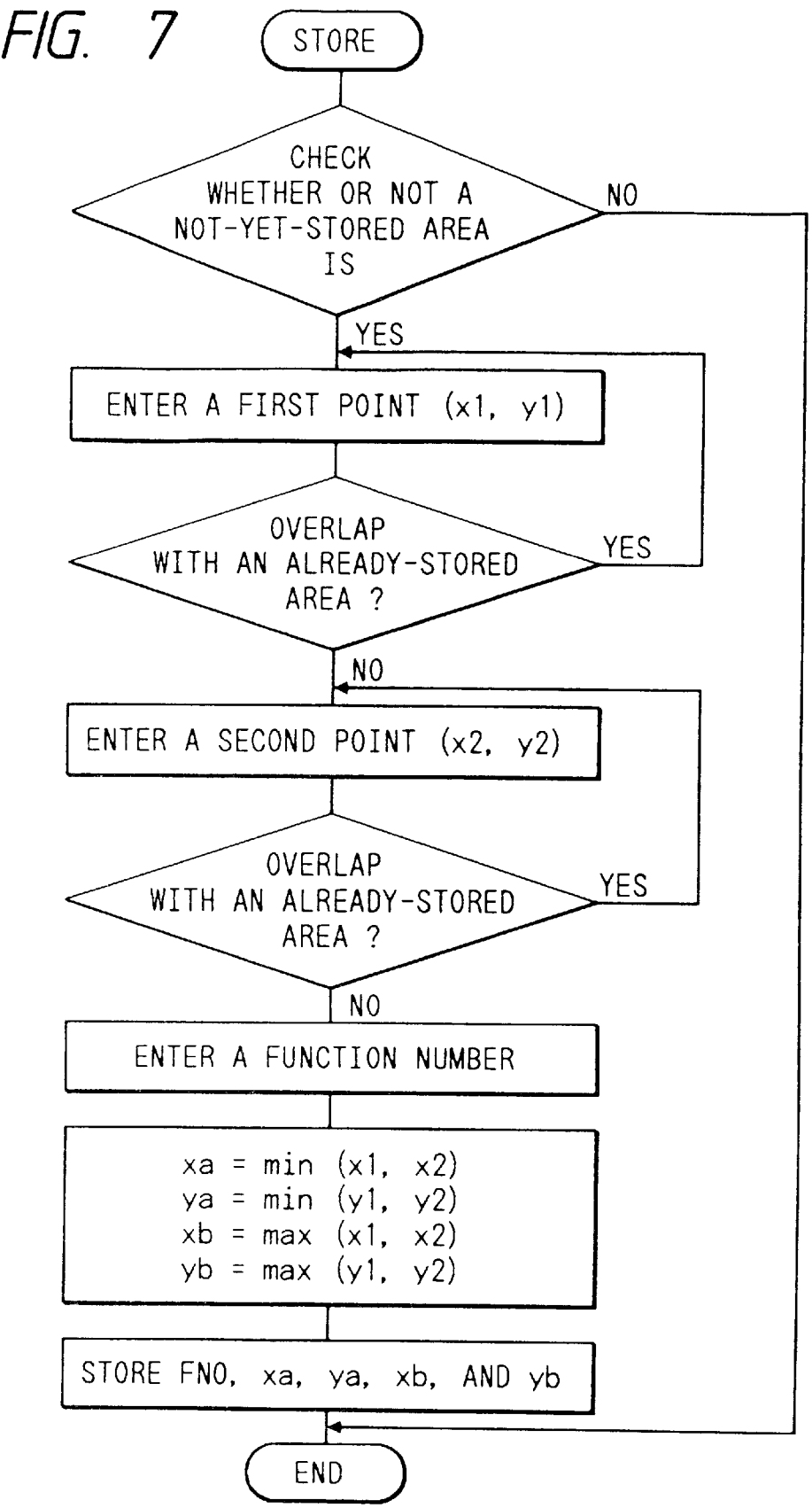
FIG. 7 shows a flowchart for explaining a storing operation of the CPU.

FIG. 7 shows a flowchart for explaining the storing operation of the CPU 5. At first, the CPU 5 checks whether or not there is a not-yet-stored area. If a not-yet-stored area exists, the answer is YES, and a first point is entered. Let the coordinates of this point be (x1, y1). The CPU 5 then checks if the coordinates (x1, y1) overlap with an already stored area. If the answer is YES, the first point must be entered again.

If the first point is successfully entered, a second point (x2, y2) is entered in a similar way. In this instance, a check is made as to whether or not the points (x1, y1) and (x2, y2) have already been stored to present storage areas from overlapping.

Figure 8:
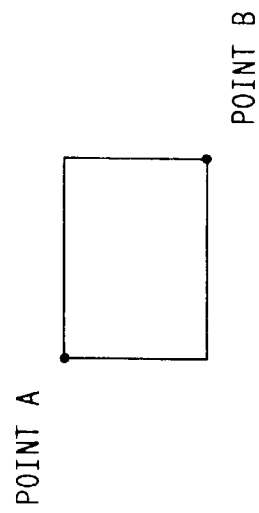
FIG. 8 shows a schematic illustration of a table containing relationships between function number and coordinates which are stored in the memory.

A function number FNO is then entered. The smaller coordinates of x1 and x2 are stored in the X-coordinates Xa of point A, and the larger coordinates of x1 and x2 are stored in the X-coordinates Xb of point B. The smaller coordinates of y1 and y2 are then stored in the Y-coordinates Ya of point A, and the larger coordinates of y1 and y2 are stored in the Y-coordinates Yb of point B. A schematic illustration of a function number coordinate table stored in the memory is shown in FIG. 8.

The operation to apply specific functions, e.g., sequences of key steps for the broadcast communication, copy, and the like, to function number FNO, is performed before or after the operation shown in FIG. 7.

The operation of a facsimile machine with the stored sequence of key steps will now be described.

Upon power on, the areas AB, CD, and other already-stored areas are displayed on the LCD board 12. The user puts an original on the platen of the facsimile machine, and pushes with the stylus pen 13 one of the areas already stored which represents sequences of desired operations. The CPU 5 recognizes the coordinates of the pushed point, and finds the area to which the point belongs.

When an area is designated, data stored in the area, i.e., the codes of the keys, are read out of the area in the order in which they were stored, and are sent to the CPU 5. The CPU 5 produces a predetermined control signal in accordance with the key codes. The facsimile will then execute the stored function.

When a point within the area AB is pushed by the stylus pen, the function of broadcast communication is executed.

Figure 9:
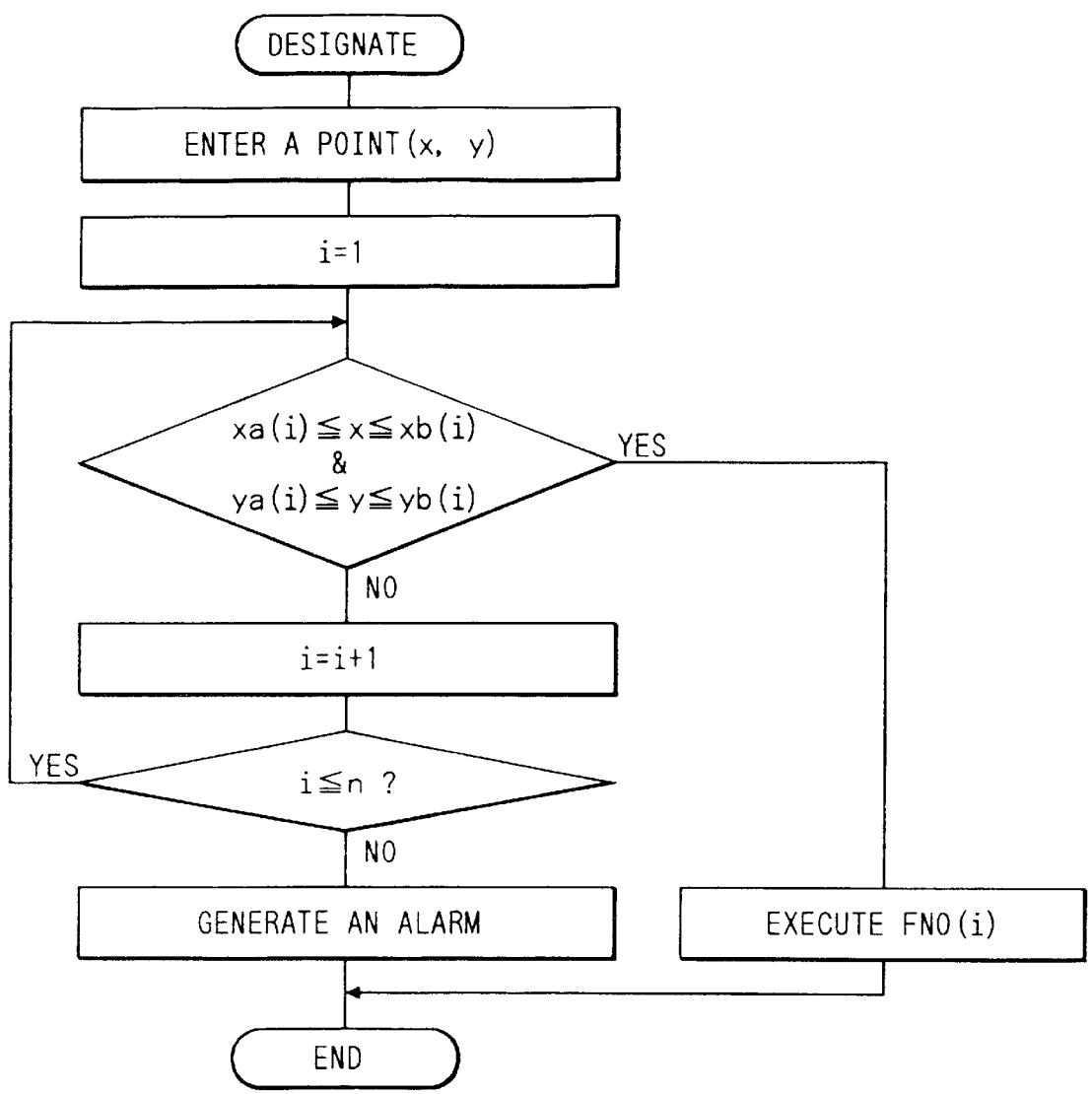
FIG. 9 shows a flowchart for explaining an example of the area designating operation, which is related to the storing operation.

FIG. 9 shows a flowchart for explaining an example of the designating operation, which is related to the storing operation shown in FIGS. 7 and 8. When the coordinates of point (x, y) are entered from the coordinate input unit 11, the CPU sets up i=1, and determines whether or not the coordinates (x, y) belong to an already-stored area. Specifically, the CPU checks whether or not the point (x, y) exists between already-stored points xa(1) and xb(1) and between already-stored points ya(1) and yb(1). If it is not within the area, the "i" is incremented and the check operation is repeated until i=n.

As a result, if the point (x, y) belongs to any of the areas, the function number of the area containing the point is executed. If there is no area containing the point, an alarm is generated and the processing ends.

The operation of storing the sequences of procedural key steps for application functions, such as broadcast communication, into areas on the coordinate input unit 11 has been described. The operation to execute the stored functions by pushing the areas has also been described. It is evident that basic functions necessary for communication and copying can be stored in the areas of the coordinate input unit 11.

Figure 10A:
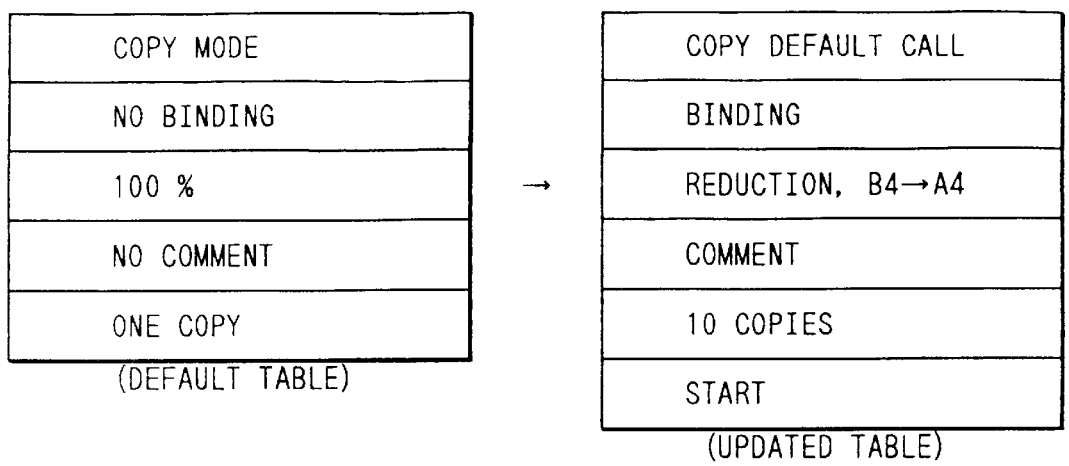
FIGS. 10(a) and 10(b) shows default tables and a series of functions as stored by using those tables.
Figure 10B:
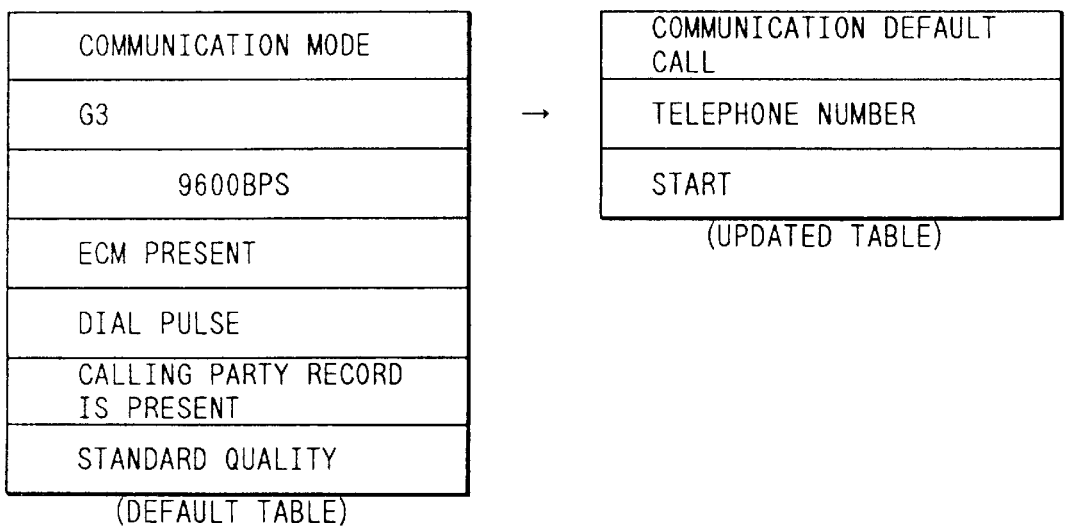

In the facsimile machine according to the instant embodiment, the basic functions for communication and copying are prestored in the battery-backup RAM 8, in the form of default values. FIG. 10(a) shows an example of a default table for a copy mode. FIG. 10(b) shows an example of default table for a communication mode.

To operate the facsimile machine in a copy mode, it is only necessary to push the start key. Upon pushing the start key, the facsimile machine operates according to the data stored in the default table. To make a copy under conditions different from that stated by the default table, the contents of the default table are altered, and the altered functions can be interrelatedly stored in an area of the coordinate input unit 11.

Figure 11A:
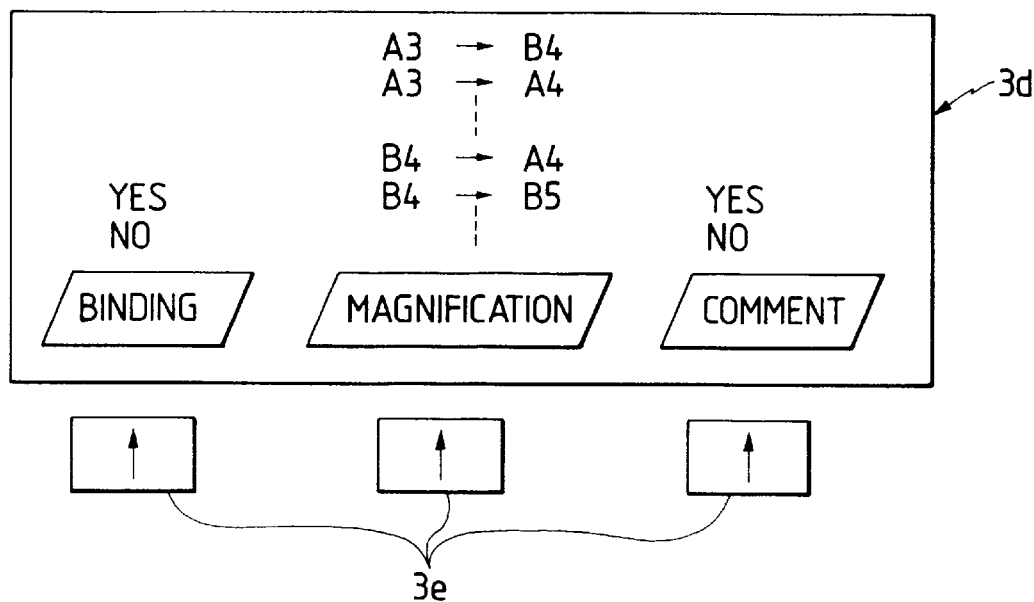
FIGS. 11(a) and 11(b) are diagrams for explaining storing operations when the default tables are used.
Figure 11B:
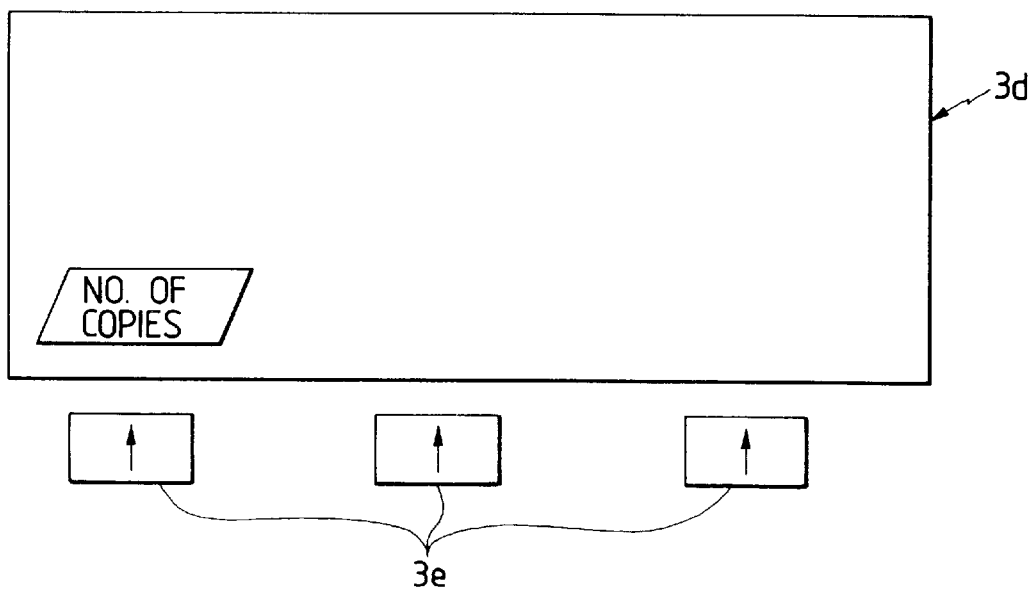

In a specific example, the store key 3f (FIG. 1) is turned on to set up a store mode. An area on the coordinate input unit 11 is stored into the RAM 8 as described above. The function key 3c is turned to the left to select the copy mode. The copy default call is then stored in the designated area. Next, the key for the basic function is pushed, so that the displays shown in FIGS. 11(a) and 11(b) successively appear on the display window 3d. After seeing the displays, a user designates desired items by using cascade keys 3e (ten keys are used for designating the number of copies). As a result, the contents of the default table are altered to those shown in FIG. 10(a). The altered contents are stored. Finally, the user pushes the start key. In this way, the function defined in the updated table shown in FIG. 10(a) is executed.

To store the communication function in an area on the coordinate input unit 11 the store key 3f is pushed and the designated area of the coordinate input unit 11 is stored in the RAM 8. The function key 3c is turned to the right to select the communication mode. In turn, a communication default call is stored in the area. The key for the basic function is then pushed. As a result, the display window 3d visually presents selected items on group identification, i.e., G3 or G2, SCM (error correct mode), calling party records, picture quality, request of entering a telephone number. Selected items are displayed, but basic items such as communication speed and the dialer setting are stored in the form of default values and are not normally altered. Accordingly, no basic item is displayed, although they may be selectively displayed in the display window 3d.

When using the default data shown in FIG. 10(b) the user does not take any action to alter the selected items. The user simply enters a telephone number, and turns on the start key.

In cases where some default items are stored in association with areas of the coordinate input unit 11, a user simply enters the items to be altered or added. In other words, there is no need for the user to enter the stored contents of every item. To store the communication function, for example, the user enters a communication default call, the telephone number, and the start key. Then, for other items not entered, the default values are automatically used. Thus, the storing operation is simple and easy. In this respect, the storing operation is simplified.

The contents in the default table stored in the battery-backup RAM 8 can be reprogrammed by the user. Generally, the values providing the highest probability that the apparatus will be operable in the best condition are used as default values. Accordingly, if the user alters the default values, the probability that trouble will occur in the apparatus is increased. If desired functions are stored in an area on the coordinate input unit 11 using the default table, the probability that the apparatus will improperly operate is increased, because the default values have been altered.

The above problems can be solved by storing the default table in a ROM 6 (see FIG. 1) that is not reprogrammable, or by setting the system defaults at the above default value at the time of delivery from the factory.

Figure 6:
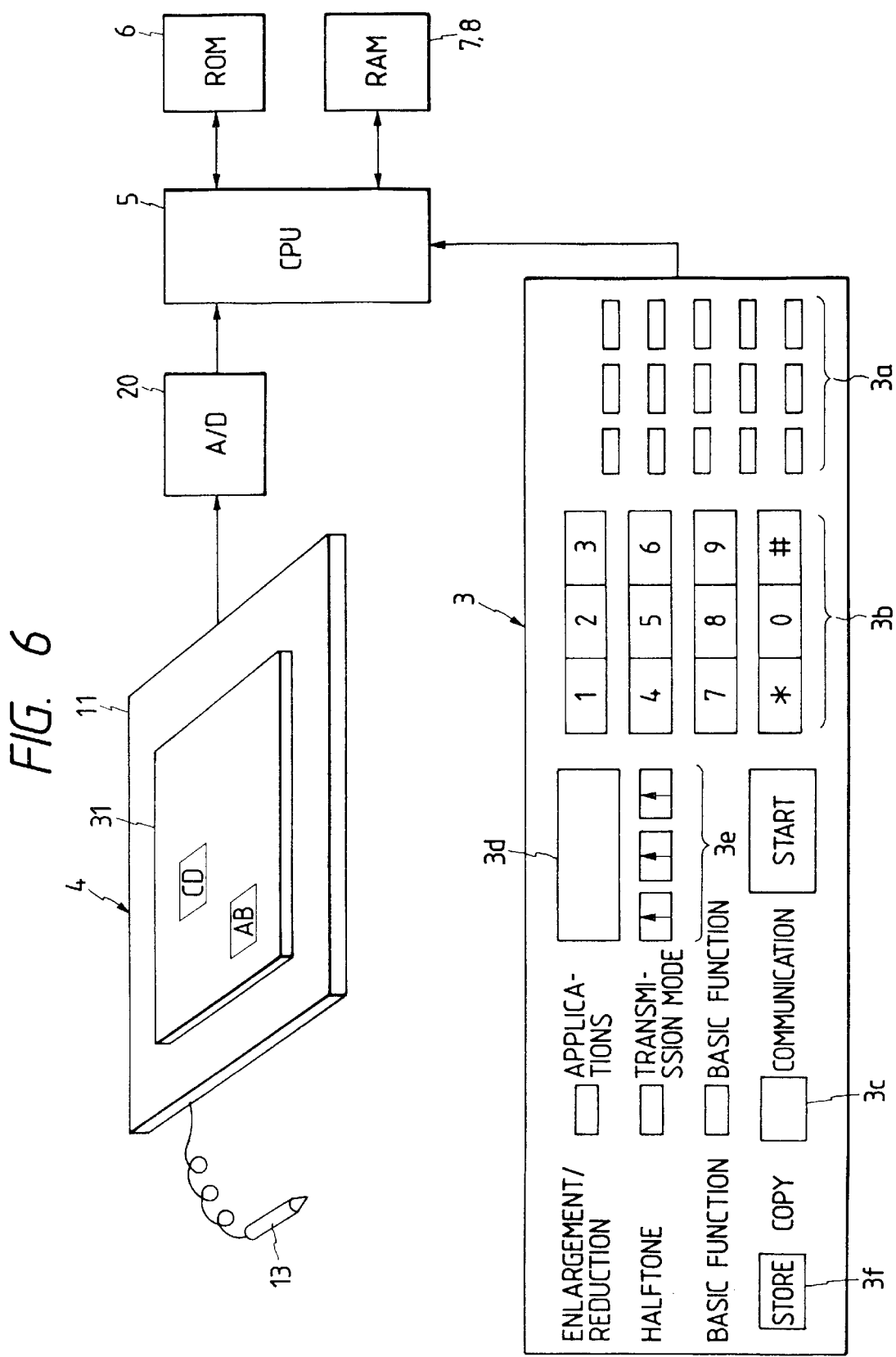
FIG. 6 shows, in block diagram and schematic form, an arrangement of a key portion of a second embodiment of the present invention.

A second embodiment of the present invention will be described with reference to FIG. 6.

In the second embodiment the LCD board 12 is removed, and an overlay 31 is placed on the coordinate input unit 11.

In the second embodiment, the areas AB, CD, . . . are previously established and marked on the overlay 31. The overlay 31 bearing those areas is placed on the coordinate input unit 11 in a registered manner. Then, a user pushes points A and B on the overlay with the stylus pen 13 to store the area AB into the RAM 7 or the RAM 8, through the CPU 5. Subsequently, as in the first embodiment, a desired function is stored into the area AB by operating related keys in a predetermined sequence of key steps. Other functions are stored into other areas in a similar manner.

Alternatively, in place of the overlay, the incons or insignias of the areas may be put on the coordinate input unit 11 with a suitable marking means, such as a felt-tipped marker, or labels may be affixed on the areas.

Another alternative is that only the coordinate input unit 11 is used for storing the areas and sequences of key steps. After a number of areas are designated, the stored areas are printed out. A hard copy print out shows a layout of the stored areas and is used as an overlay. By this storage method, a desired overlay is easily formed.

Sequences of processing steps are stored in association with the areas shown on the overlay. To read out and execute a stored sequence, a user puts the overlay 31 on the coordinate input unit 11, and pushes the specific points in the area with the stylus pen 13. Then, as in the first embodiment, the CPU selects from the RAM 7 or the RAM 8 the unique area including the coordinates of the points. If the area is found, the sequence of processing steps stored in association with the area is executed automatically. In this way, a desired function is exercised.

In the first and second embodiments, the processing steps stored in association with each area on the coordinate input unit 11 can be altered by anyone. Accordingly, one frequently encounters a problem when a user stores the steps of his desired function and another person alters the contents of the function. In such a situation, when using the function, the first user cannot read out the initial function.

To prevent this drawback, a password is used, which allows one to store or alter the operation procedure with relation to the area. Specifically, after the store key 3f (see FIG. 1) is turned on, the apparatus requests a user to enter a password, and allows the user access to the apparatus only when the password is coincident with that prestored. If the entered password is not coincident, an alarm is generated.

In the embodiments discussed above, the areas on the coordinate input unit 11 and the sequence of key steps are stored in the RAM 7 or the RAM 8. A memory card may be used in place of the RAM. In this case, each individual person may have his own layout of function key areas on the coordinate input unit 11.

In the above-mentioned embodiments, to designate a function key area on the coordinate input unit 11, two points lying on a diagonal line of the area are used. If required, one point may be used. In this case, if a point is selected and pushed, an area of specific size and shape containing the point is automatically selected and stored.

As seen from the foregoing description, the present invention has the following beneficial effects.

(1) The operability of the apparatus is improved. Upon a single push by the stylus, the apparatus can initiate a function, which otherwise would require many key operations.

(2) The utility of the coordinates input unit is improved, because the input unit includes the additional useful functions.

(3) A user can creatively use the coordinate input unit, because the user can lay out functional areas on the input unit.

(4) When IC cards, which are removable, are used for storing the key procedures with relation to the function areas on the input unit, the key procedures may be different for different IC cards. Therefore, the functional areas may be used more variously. A user can define function areas according to individual preference.

The foregoing description of preferred embodiments of the invention has been presented for purposes of illustration and description. It is not intended to be exhaustive or to limit the invention to the precise form disclosed, and obviously many modifications and variations are possible in light of the above teachings or may be acquired from practice of the invention. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. A single key input system for an apparatus useful for performing a plurality of operations, comprising:

a transparent coordinate input unit including electrically resistive members;

stylus means for selecting coordinates on the coordinate input unit by pressing said unit with said stylus;

electronic computing means for defining a designated area unassociated with any operation and having an arbitrary size and location on the input unit based on the selected coordinates;

control means for designating an operation having a plurality of control steps;

memory means for storing said designated operation and for storing an association between said designated operation and said designated area; and means for executing said plurality of control steps of said designated operation in response to the selection of said designated area associated with said designated operation.

2. A single key input system according to claim 1, wherein said input unit comprises a touch screen panel and each of said designated areas is designated by touching one or more points on said touch screen panel with a stylus pen.

3. A single key input system according to claim 1, wherein said input unit comprises a transparent touch screen panel.

4. A single key input system for an apparatus according to claim 3, further comprising a liquid crystal display placed under said transparent touch screen panel, and wherein said liquid crystal display displays the designatable areas that have been designated.

5. A single key input system for an apparatus according to claim 1, further comprising an overlay placed on said input unit to indicate the designatable areas.

6. A single key input system for an apparatus according to claim 1, wherein said memory means comprises an integrated chip card.

7. A single key input system for an apparatus having a plurality of operations, comprising:

a transparent coordinate input unit including electrically resistive members and a power source;

stylus means for selecting coordinates on the coordinate input unit by pressing said unit with said stylus;

electronic computing means for defining designated areas unassociated with any operation and having an arbitrary size and location on the input unit based on the selected coordinates;

first memory means for storing a plurality of default sequences of control steps, each of said default sequences being associated with a different one of the plurality of operations to cause the apparatus to perform the associated operation;

second memory means for storing a plurality of sequences of key control steps and one of said plurality of default sequences, and for storing an association between each of said sequences and a different one of said designated areas; and means for causing one of said default sequences to be performed by the apparatus in response to the selection of said designated area associated with said one of said default sequences.

8. A single key input system for an apparatus according to claim 7, wherein said input unit comprises a touch screen panel and each of said designated areas is designated by touching one or more points on said touch screen panel with a stylus pen.

9. A single key input system according to claim 8, wherein said touch screen panel is transparent.

10. A single key input system for an apparatus according to claim 9, further comprising a liquid crystal display placed under said transparent touch screen panel, and wherein said liquid crystal display displays the designatable areas that have been designated.

11. A single key input system for an apparatus according to claim 7, wherein the first memory means is programmable to enable the selective modification of said default operations.

12. A single key input system for an apparatus according to claim 7, wherein the first memory means is a read only memory.

13. A single key input system for an apparatus according to claim 7, wherein the second memory means is an integrated chip card.

14. A single key input system for an apparatus having a plurality of operations, comprising:

a transparent coordinate input unit including electrically resistive members and a power source;

stylus means for selecting coordinates on the coordinate input unit by pressing said unit with said stylus;

electronic computing means for defining designated areas unassociated with any operation and having an arbitrary size and location on the input unit based on the selected coordinates;

first memory means for storing a plurality of default sequences of control steps, each of said default sequences being associated with a different one of the plurality of operations to cause the apparatus to perform the associated operation;

altering means for selectively altering the control steps of said default sequence of control steps;

second memory means for storing an association between each of said default sequences and a different one of said designated areas; and means for causing said default sequence to be performed by the apparatus in response to the selection of said designated area associated with said default sequence.

15. A single key input system for an apparatus according to claim 14, wherein said input unit comprises a touch screen panel and each of said designated areas is designated by touching one or more points on said touch screen panel with a stylus pen.

16. A single key input system according to claim 15, wherein said touch screen panel is transparent.

17. A single key input system for an apparatus according to claim 16, further comprising a liquid crystal display placed under said transparent touch screen panel, and wherein said liquid crystal display displays the designatable areas that have been designated.

18. A single key input system for an apparatus according to claim 15, wherein the second memory means is an integrated chip card.

19. A process for programming a set sequence of operations for execution with a single key input, comprising the steps of:

selecting by a user coordinates on a transparent input unit having an electrically resistive portion and a power supply by pressing a stylus on said input unit;

defining a user-defined key area unassociated with any operation and having an arbitrary size and location on the input unit based on the selected coordinates;

defining a function to include a sequence of operations;

storing an association between the user-defined key area and the defined function; and executing the sequence of operations of the defined function in response to the selection of the user-defined key area associated with the defined function.

20. A process for programming a set seqence of operations for execution with a single key input according to claim 19, further comprising the step of entering a required password before defining the function including the sequence of operations.

* * * * *